(12) United States Patent
Oldcorn et al.

(10) Patent No.: US 9,632,848 B1
(45) Date of Patent: Apr. 25, 2017

(54) ASYNCHRONOUS SUBMISSION OF COMMANDS

(71) Applicant: Advanced Micro Devices, Inc., Sunnyvale, CA (US)

(72) Inventors: David Oldcorn, Fleet (GB); Timour T. Paltashev, Sunnyvale, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 0 days.

(21) Appl. No.: 14/982,974

(22) Filed: Dec. 29, 2015

(51) Int. Cl.
*G06F 13/00* (2006.01)
*G06F 9/54* (2006.01)
*G06F 13/10* (2006.01)

(52) U.S. Cl.
CPC ............. *G06F 9/541* (2013.01); *G06F 9/544* (2013.01); *G06F 13/102* (2013.01)

(58) Field of Classification Search
CPC ........... G06F 3/14; G06F 9/4411; G06F 9/541
USPC ......................................... 719/321, 323, 328
See application file for complete search history.

(56) References Cited

U.S. PATENT DOCUMENTS

2016/0210719 A1\* 7/2016 Pelton ....................... G06T 1/20

\* cited by examiner

*Primary Examiner* — Andy Ho
(74) *Attorney, Agent, or Firm* — Volpe and Koenig, P.C.

(57) ABSTRACT

A system and method for allocating commands in processing is disclosed. The system and method includes an application running on a computer system that provides commands to be executed on one of a plurality of processors capable of executing the commands, the commands provided through an application programming interface, a device driver that buffers the streamed commands and converts the streamed commands into a format used by a GPU, and an operating system that builds a command buffer by grouping a plurality of converted commands based on an allocation for an available processor, wherein the available processor is determined in the interface between the device driver and the operating system. The available processor is one of the plurality of processors capable of executing the commands that receives the command buffer from the operating system, queues the command buffer and performs an asynchronous submission of the command buffer to the GPU, and the GPU executes the command buffer.

20 Claims, 4 Drawing Sheets

ASYNCHRONOUS SUBMISSION OF COMMANDS

TECHNICAL FIELD

The disclosed embodiments are generally directed to submission of commands to processors, and in particular, to the asynchronous submission of commands to a processor.

BACKGROUND

A driver for a processing unit is a component which takes a command stream from an application, such as by an operating system component, as input, and generates another command stream as output. The command stream that is output may be submitted to an operating system in order to be sent to the hardware for processing. For example, a graphics driver for a graphics processing unit (GPU) is a component which takes a command stream from an application for graphics processing as an input, and generates another command stream as an output to the GPU to enable the GPU to perform the needed processing. This output command stream may be submitted to an operating system and other driver components in order to be sent to the GPU for execution.

Submission of the command stream, such as the processing of the command stream by the operating system and level drivers, for example, may use a significant percentage of the cost of delivering the command stream from the application to the processing unit.

Generally, modern computing systems include many individual processing unit cores. The usage of these cores, in any given snapshot, may not be well-balanced. That is, some of the cores may be heavily loaded while others are not. A benefit in efficiency may result in moving work from a heavily loaded processing unit core to a more lightly loaded core.

In addition, on a central processing unit (CPU) bottle-necked application, the driver thread may be the factor limiting performance. A driver thread is the CPU sequence of instructions which has as its results a command sequence for the GPU. For example, the conversion from Application Programming Interface (API) command to GPU command is a sequential process which may be bottlenecked by the CPU. The ability to alleviate this bottleneck may therefore increase performance.

Present solutions to this problem focus on reducing the bottleneck at the top of the driver stack. Therefore, a need exists to alleviate this bottleneck at other places within the driver stack to eliminate the visibility of the time spent in the operating system components.

SUMMARY OF EMBODIMENTS

A system and method for allocating commands in processing is disclosed. The system and method includes an application running on a computer system that provides commands to be executed on one of a plurality of processors capable of executing the commands, the commands provided through an application programming interface, a device driver that buffers the streamed commands and converts the streamed commands into a format used by a GPU, and an operating system that builds a command buffer by grouping a plurality of converted commands based on an allocation for an available processor, wherein the available processor is determined in the interface between the device driver and the operating system. The available processor is one of the plurality of processors capable of executing the commands and receives the command buffer from the operating system, queues the command buffer and performs an asynchronous submission of the command buffer to the GPU, and the GPU executes the command buffer.

The method for allocating commands in processing includes streaming commands from an application through the application programming interface, buffering the streamed commands in a device driver, converting, in the device driver, the buffered commands into a format used by a GPU, allocating the commands for an available processor, building a command buffer via an operating system by grouping a plurality of commands for the available processor, queuing the command buffer as a work unit for asynchronous submission to the GPU, asynchronously submitting the command buffer to the GPU, and executing the command buffer in the GPU.

BRIEF DESCRIPTION OF THE DRAWINGS

A more detailed understanding may be had from the following description, given by way of example in conjunction with the accompanying drawings wherein.

DETAILED DESCRIPTION

A system and method for allocating commands to eliminate bottlenecks in processing is disclosed. The system and method includes an application running on a computer system that provides commands to be executed on one of a plurality of processors capable of executing the commands, the commands provided through an application programming interface, a device driver that buffers the streamed commands and converts the streamed commands into a format used by a GPU, and an operating system that builds a command buffer by grouping a plurality of converted commands based on an allocation for an available processor, wherein the available processor is determined in the interface between the device driver and the operating system. The available processor is one of the plurality of processors capable of executing the commands and receives the command buffer from the operating system, queues the command buffer and performs an asynchronous submission of the command buffer to the GPU, and the GPU executes the command buffer.

The method for allocating commands to eliminate bottlenecks in processing includes streaming commands from an application through the application programming interface, buffering the streamed commands in a device driver, converting, in the device driver, the buffered commands into a format used by a GPU, allocating the commands for an available processor, building a command buffer via an operating system by grouping a plurality of commands for the available processor, queuing the command buffer as a work unit for asynchronous submission to the GPU, asynchronously submitting the command buffer to the GPU, and executing the command buffer in the GPU. The system and method for allocating commands to eliminate bottlenecks in processing may be described in more detail below with reference to FIGS. 1-4.

Figure 1:
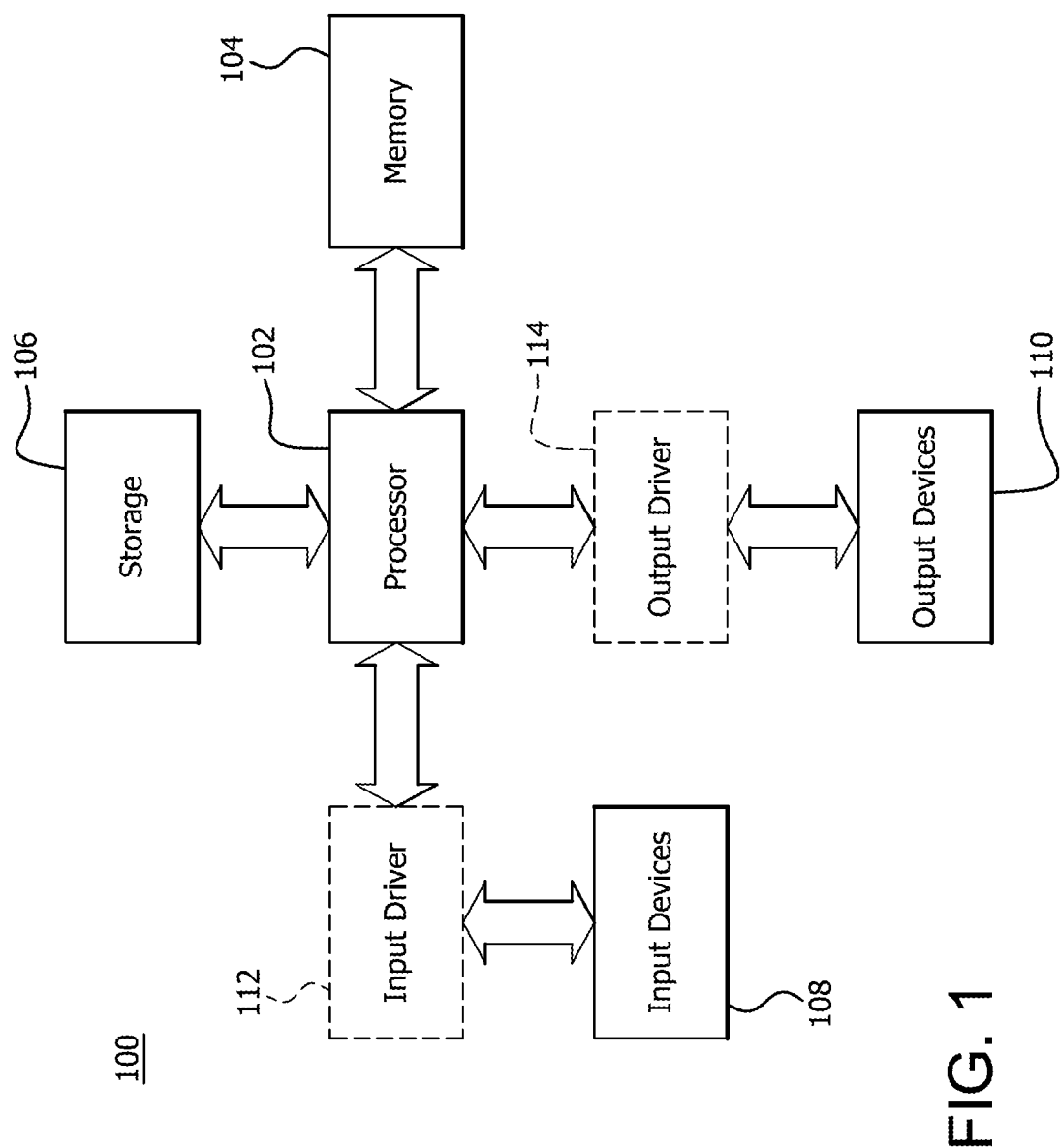
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
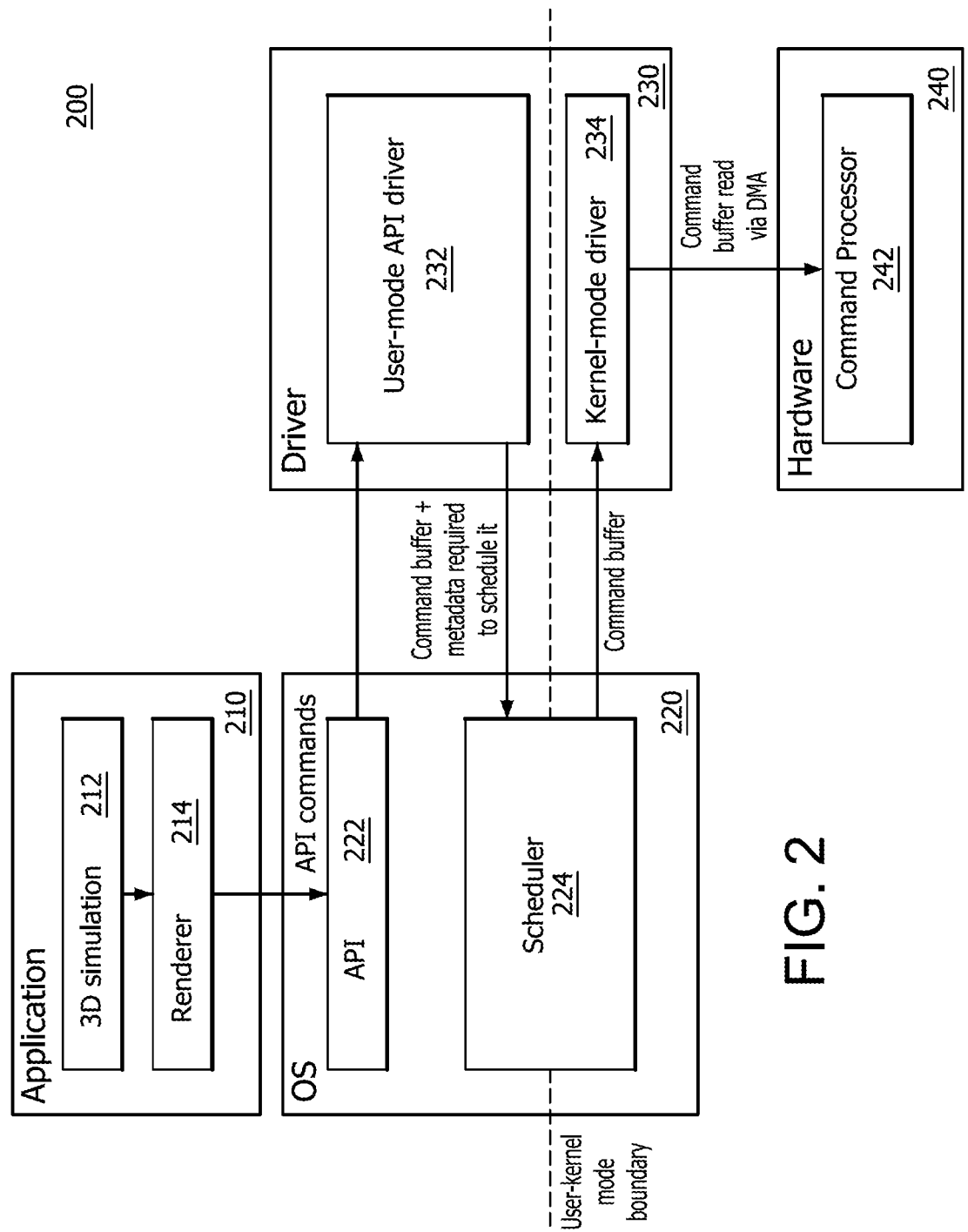
FIG. 2 illustrates a system that may benefit from the present asynchronous submission of commands to a processor.

FIG. 2 illustrates a system 200 that may benefit from the present asynchronous submission of commands to a processor described herein. As illustrated system 200 may include an application 210, an operating system 220, a driver 230, and hardware 240 which will be described in detail hereinafter. Generally, application 210 may submit Application Programming Interface (API) commands to the operating system 220. Operating system 220 interacts with driver 230 to schedule and buffer the commands. Driver 230 may then submit the commands to the hardware 240 for processing.

Application 210 may take the form of an application program that generally may be a computer program designed to perform a group of coordinated functions, tasks, or activities for the benefit of the user. For example, application 210 may be a video game that provides a displayed output to a user.

API may include a set of routines, protocols, and tools for building software applications. Generally, an API expresses a software component in terms of its operations, inputs, outputs, and underlying types. An API defines functionalities that are independent of their respective implementations, which allows definitions and implementations to vary without compromising the interface for accessing databases or computer hardware, such as hard disk drives or video cards. API commands are the commands or routines used to interact with hardware components. For example, an API may be used by application 210 to provide video for display to a user. In such an example, the API may interface with a video card.

APIs often come in the form of a library that includes specifications for routines, data structures, object classes, and variables. In other cases, notably SOAP and REST services, an API is simply a specification of remote calls exposed to the API consumers.

An API specification can take many forms, including an International Standard, such as POSIX, vendor documentation, such as the Microsoft Windows API, or the libraries of a programming language, e.g., the Standard Template Library in C++ or the Java APIs.

Operating system 220 may include any system software that manages computer hardware and software resources and provides common services for computer programs. Operating system 220 is a component of the system software in a computer system. Application programs, such as application 210, usually require an operating system 220 to function. Operating systems 220 may schedule tasks for efficient use of the system and may also include accounting software for cost allocation of processor time, mass storage, printing, and other resources.

For hardware functions such as input, output and memory allocation, operating system 220 acts as an intermediary between programs and the computer hardware. The application code is usually executed directly by the hardware and makes system calls to an operating system function or to be interrupted by it. Operating system 220 interacts with driver 230 to schedule and buffer the command. Examples of popular modern operating systems include Android, BlackBerry, BSD, Chrome OS, iOS, Linux, OS X, QNX, Steam OS, Microsoft Windows (and variant Windows Phone) and z/OS.

Driver 230 may be a device driver that is a computer program that operates or controls a particular type of device that is attached to a computer. Driver 230 provides a software interface to hardware devices, enabling operating systems and other computer programs to access hardware functions without needing to know precise details of the hardware being used. For example, driver 230 may take the form of a video driver when the application 210 includes rendering images.

Driver 230 typically communicates with the hardware 240 through a computer bus (not shown) or a communications subsystem (not shown) to which the hardware connects. When a calling application 210 invokes a routine in driver 230, driver 230 issues commands to the hardware 240. Once hardware 240 sends data back to driver 230, driver 230 may invoke routines in the original calling application 210. Drivers 230 are hardware 240 dependent and operating-system 220 specific. Drivers 230 usually provide the interrupt handling required for any necessary asynchronous time-dependent hardware interface. Driver 230 may then submit the command to the hardware 240 for processing.

There are multiple different techniques or ways of arranging the communication between operating system 220, driver 230 and hardware 240. For example, as generally described herein, operating system 220 may control, or otherwise "own," the communication with hardware 240. Other techniques may focus on driver 230 control or "ownership," or be less dependent on operating system 220, for example.

Hardware 240 may take the form of any physical part or component of a computer, including by non-limiting example, monitors or displays, mouses, keyboards, storage devices, graphics devices or cards, sounds cards, memory, motherboards, and other tangible parts of a computer.

More specifically, and by way of non-limiting example, application 210 may include a 3D simulator 212 and a renderer 214. Operating system 220 may include an API 222 and a scheduler 224. Driver 230 may include a user-mode API driver 232 and a kernel-mode driver 234. Hardware 240 may include a command processor 242.

In this example, application 210 may seek to provide a simulation using 3D simulator 212. Renderer 214 may provide the necessary commands to display the images on the screen. The operating system 220 receives the commands from application 210 via renderer 214. Operating system 220 utilizes API 222 to decode the commands from application 210 and may utilize scheduler 224 to plan the processing of the commands via driver 230 to processor 242 of hardware 240. Driver 230 may include two parts: a user-mode driver 232 that interacts with API 222 and outputs back to operating system 220 and a kernel-mode driver 234 that receives commands from scheduler 224 and outputs a command buffer to the hardware 240.

In operation, 3D simulator 212 may request rendering from renderer 214 within application 210. Application 210 may generate the API command stream from its renderer 214. This may be driven as a simulation from a simulation engine, depicted as 3D simulator 212.

Renderer 214 may provide API commands to the API 222 of operating system 220. API 222 may take the form of a Direct3D, OpenGL, or the like. For example, in Direct3D, API 222 performs parameter validation and some translation parameters. In other APIs, component API 222 may be thin or even non-existent in system 200.

API 222 of operating system 220 may communicate with user-mode API driver 232 of driver 230. User-mode API driver 232 may translate the API calls into command buffers suitable for execution on the installed hardware 240. User-mode API driver 232 may also generate any metadata required for scheduling the command buffer. This may include a list of referenced memory allocations and any dependencies on previous command buffers, for example. User-mode API driver 232 may communicate the command buffer and metadata to scheduler 224 of operating system 220.

The command buffer and metadata may then be processed by the operating system 220 for processing. In order for the scheduling, such as in kernel mode, to be maximally efficient, preparatory work may be performed to minimize time in the kernel modes as opposed to time in kernel mode later in the process if preparatory work is not performed. Scheduler 224 may include user and kernel mode components, for example. Scheduler 224 may provide command buffer to the kernel-mode driver 234 of driver 230. When dependencies are satisfied, the command buffer becomes runnable, and at some point, the command buffer may be selected by scheduler 224 for execution.

The command buffer details are delivered to the video driver's kernel-mode component such as kernel-mode driver 234, which may then provide the instructions to hardware 240 to read and execute the command buffer. Command buffer may be read via DMA to command processor 242 of hardware 240. Command processor 242 may take the form of rendering hardware, for example.

The described interactions are simplified for ease of understanding the present invention and a person having ordinary skill in the pertinent arts would understand that more details of the interactions between components are necessary and occur. The example present FIG. 2 includes all of the key components involved in the translation of application API requests into pixels visible to the user, for example.

Figure 3:
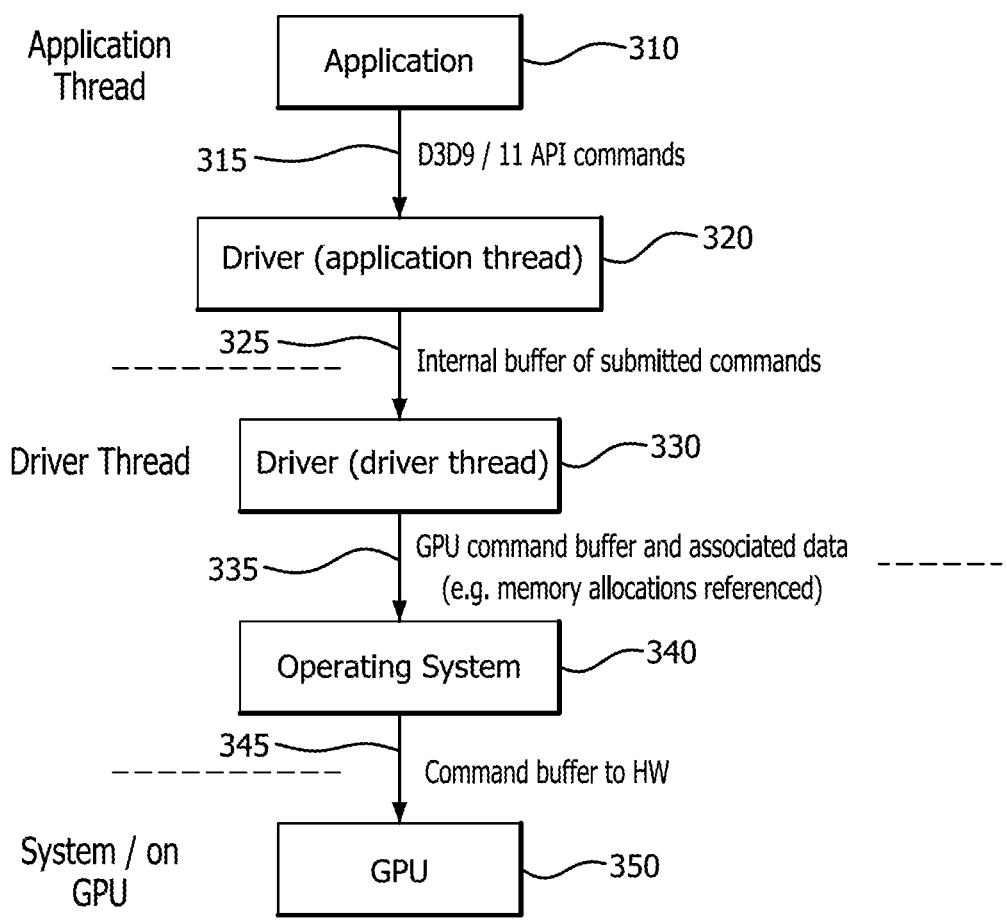
FIG. 3 illustrates data flow that may occur in the system illustrated in FIG. 2.

Referring now to FIG. 3, there is shown a data flow 300 along with the main data processing operations. In data flow 300, an application 310 generates commands 315. These commands may be sequential API commands, for example. Application 310 may provide these commands 315 to a driver 320.

Driver 320 may take the application thread and may perform lightweight buffering, for example. Driver 320 may provide internal buffering of submitted commands 325 to a driver 330.

Driver 330 may take the driver thread and may perform the more elaborate conversion to GPU buffers. At this point in the data flow 300, the driver 330 may provide information 335 to the GPU command buffer and other associated data, such as memory allocations, for example, to an operating system 340.

Operating system 340 upon receiving the command buffer from driver 330 may prepare the commands for execution in the GPU by sending 345 the command buffer to the hardware, such as GPU 350. GPU 350 may then process the commands.

The thread boundary between driver 330 and operating system 340 may provide an opportunity to balance the load between processors by moving work from more heavily loaded processors to more lightly loaded processors. This may eliminate the driver thread from limiting performance.

As discussed hereinabove, at the boundary between driver 330 and operating system 340 there may be an opportunity to redirect processing to a different processor. This spreading of work to additional and/or alternative CPUs may involve a two-step process. First, under the control of application 210 (in FIG. 2), and/or second, under the control of the operating system 220 (in FIG. 2). The workload may be compared with the available resources. This may be achieved by counting the threads that a CPU may simultaneously execute, by estimating the likely workload profile of the application at application start-up time, or by applying a specific profile for a given application, or using a combination of these techniques. Once the decision has been made, a new thread may be created. From the creation of the new thread on, the data coming out of the calculation step is buffered and provided to the new thread via known patterns, such as by queuing work units into a producer-consumer buffer.

Once the new thread is created, the operating system scheduler 224 (in FIG. 2) may track the utilization of each thread on the system, and allocate the threads to individual available CPU threads of execution. This technique may provide beneficial results when the number of busy threads in the system is lower than the number of threads the CPU can simultaneously execute. This condition is generally true given that new threads are created when the application is created as described above.

This may also occur at the interface between driver 320 and driver 330 or between operating system 340 and hardware 350. The boundary between driver 330 and operating system 340 provides an opportunity to alleviate any bottleneck that has occurred in processing.

Figure 4:
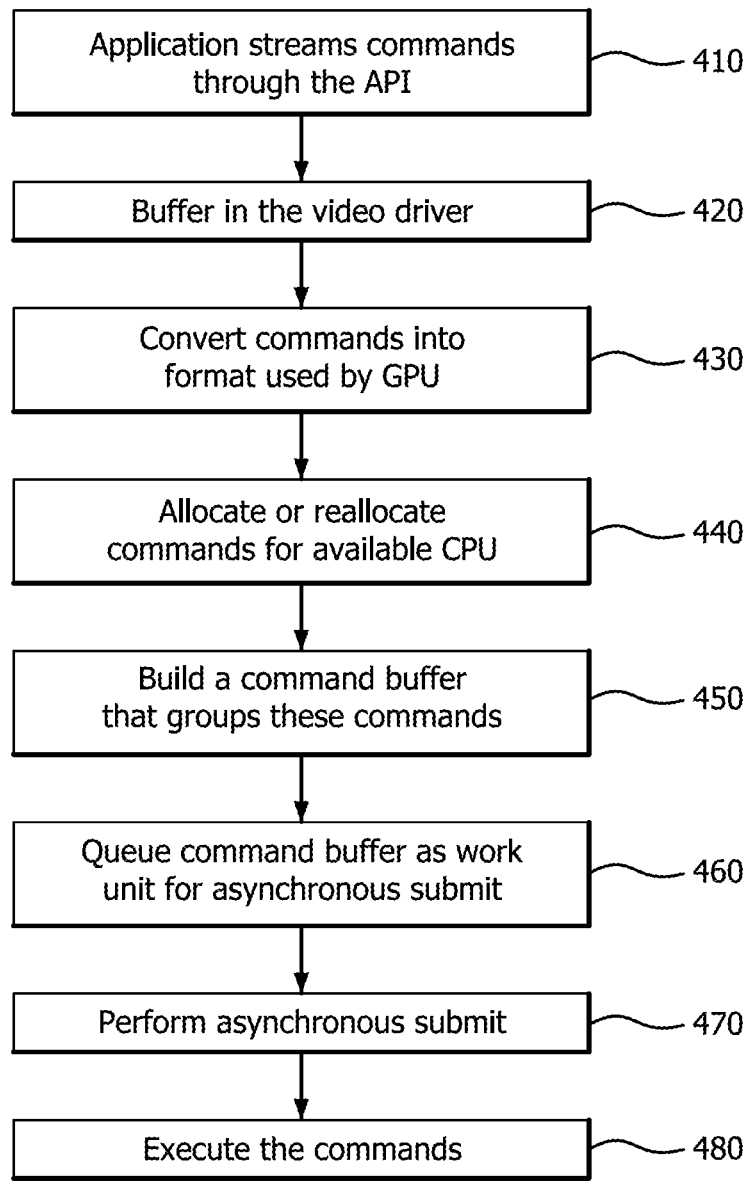
FIG. 4 illustrates a method for performing asynchronous submission of commands to a processor.

FIG. 4 is a flow diagram of a method 400 for performing the asynchronous submission of commands to a processor. Method 400 may be performed in a system described above with respect to FIGS. 1 and 2 following a data flow of FIG. 3, for example. Method 400 includes an application streaming commands through the API at step 410. A video driver buffers the streamed commands at step 420. Then the buffered commands are converted into a format used by the GPU at step 430. Method 400 may include allocating or reallocating the commands for an available CPU at step 440. Once in the appropriate format, the command buffer is built by grouping a series of commands at step 450. The command buffer may be queued as a work unit for the asynchronous submission at step 460. At step 470, an asynchronous submission may be performed. Based on a trigger, such as the buffer being filled, the command buffer is sent to the processor for execution at step 480.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

It should be understood that many variations are possible based on the disclosure herein. Although features and elements are described above in particular combinations, each feature or element may be used alone without the other features and elements or in various combinations with or without other features and elements.

What is claimed is:

1. A system for allocating commands in processing, said system comprising:
   an application running on a computer system that provides commands to be executed on one of a plurality of processors capable of executing the commands, the commands provided through an application programming interface;
   a device driver that buffers the commands and converts the commands into a format used by at least one graphics processing unit (GPU); and
   an operating system that builds a command buffer by grouping a plurality of converted commands based on an allocation for an available processor, wherein the available processor is determined in an interface between the device driver and the operating system;
   wherein the available processor being one of the plurality of processors capable of executing the commands receives the command buffer from the operating system, queues the command buffer and performs an asynchronous submission of the command buffer to the at least one GPU, and the GPU executes the command buffer.

2. The system of claim 1 wherein the system eliminates a backlog of commands.

3. The system of claim 1 wherein the one of the plurality of processors is a central processing unit (CPU).

4. The system of claim 1 wherein the allocation of the available processor enables processing of a driver thread.

5. The system of claim 4 wherein the driver thread provides a command sequence for the GPU.

6. The system of claim 1 wherein the device driver comprises a video driver.

7. The system of claim 1 wherein the operating system controls communication with the GPU.

8. The system of claim 1 wherein the device driver generates metadata for scheduling the command buffer.

9. The system of claim 8 wherein the metadata comprises at least one dependency on at least one previous command buffer.

10. The system of claim 8 wherein the metadata comprises at least one referenced memory location.

11. A method for allocating commands in processing, said method comprising:
    streaming commands from an application through an application programming interface;
    buffering the streamed commands in a device driver;
    converting the buffered commands, in the device driver, into a format used by an GPU;
    allocating the commands for an available processor;
    building a command buffer via an operating system by grouping a plurality of commands for the available processor;
    queuing the command buffer as a work unit for asynchronous submission to the GPU;
    asynchronously submitting the command buffer to the GPU; and
    executing the command buffer in the GPU.

12. The method of claim 11 wherein the method eliminates a backlog of commands.

13. The method of claim 11 wherein the available processor is a central processing unit (CPU).

14. The method of claim 11 further comprising enabling processing of a driver thread by allocation of the available processor.

15. The method of claim 14 further comprising providing a command sequence for the GPU in the driver thread.

16. The method of claim 11 wherein the device driver comprises a video driver.

17. The method of claim 11 wherein the operating system controls communication with the GPU.

18. The method of claim 11 further comprising generating metadata for scheduling the command buffer in the device driver.

19. The method of claim 18 wherein the metadata comprises at least one dependency on at least one previous command buffer.

20. The method of claim 18 wherein the metadata comprises at least one referenced memory location.

* * * * *